Figure 1:
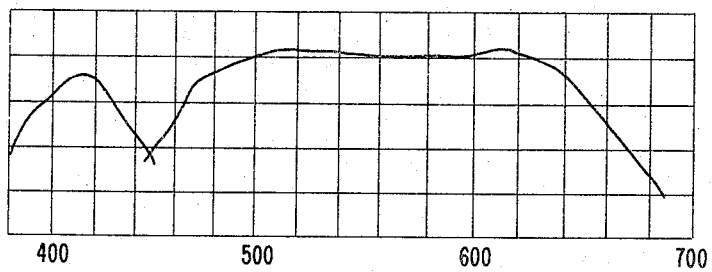

(SENSITIZED EMULSION OF EXAMPLE 1)

(SENSITIZED EMULSION OF EXAMPLE 2)

(SENSITIZED EMULSION OF EXAMPLE 3)

(SENSITIZED EMULSION OF EXAMPLE 5)

INVENTORS
WERNER FRANKE
FRIEDRICH BAURIEDEL

ATTORNEY 3,329,503
SILVER HALIDE EMULSIONS AND SENSITIZERS THEREFOR
Werner Franke, Wiesbaden, and Friedrich Bauriedel, Dreieichenhain, Germany, assignors to E. I. du Pont de Nemours and Company, Wilmington, Del., a corporation of Delaware
Filed June 16, 1964, Ser. No. 375,470
Claims priority, application Germany, Oct. 3, 1963, A 44,211
5 Claims. (Cl. 96—106)

This invention relates to photographic silver halide emulsions of high sensitization intensity in the orthochromatic range of sensitization. More particularly, it relates to gelatino-silver halide emulsions of such sensitization intensity containing novel substituted carbocyanine dyes.

Symmetrical thiazolecarbocyanines, having an alkyl group on the central carbon atom of the trimethine chain and a phenyl radical at the 4- and/or 5-position in the thiazole ring, are known as such in the art and are employed in sensitizing photographic silver halide emulsions.

It has been found in accordance with the present invention that the sensitizing power of these centrally substituted thiazole carbocyanine dyes is substantially improved, even to the extent that dyes with novel sensitizing effects can be obtained, if 5-phenylated thiazolecarbocyanines are employed in which the phenyl radicals are substituted in the m- and p- positions by alkyl, alkoxy or aryl groups in the manner represented by the general formula:

(I)
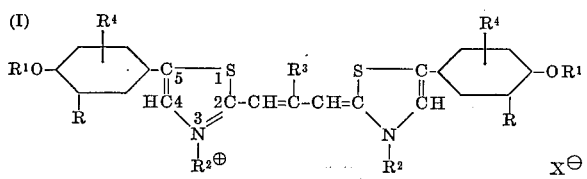

wherein R is alkyl, alkoxy or aryl; $R^1$, $R^2$ and $R^3$ are alkyl; $R^4$ is H or alkyl and X is a negative radical of an acid. Suitable specific atoms or radicals are given below with regard to Formula III.

The novel sensitizers to be employed in accordance with this invention differ substantially from the thiazole-carbocyanines known in the art as to their sensitizing properties, which entails a number of notable advantages for sensitizing silver halide emulsions.

Thus, the sensitizers contemplated by this invention can be used to particular advantage for sensitization over a broad spectral range.

For the purposes just named it is usually necessary to use sensitizer blends, predetermined with scrupulous care, because it is only in the most exceptional cases that one sensitizer alone can sensitize to the requisite intensity the entire spectral range to be sensitized. Yet the number of dyes which can be utilized for such sensitizer blends is restricted, particularly by the fact that the utmost possible additional rise in general sensitivity is desired simultaneously with optical sensitization, so that sensitizers which do not have such a sensitivity-enhancing effect are not eligible. Added to this is the fact that even highly effective sensitizers often encounter impaired capacity to exert their full effect in blends, and in many cases they also leave in the developed and fixed material an intense residual coloration.

The designated drawbacks can be fully eliminated by the sensitizing dyes provided by this invention. Because of their novel properties, these compounds can be used with most excellent effect for sensitization over broad spectral bands, such use being applicable alone or in blends with other dyes, according to the type of emulsion.

In silver chloride-bromide emulsions and in straight silver chloride emulsions the sensitizers here disclosed give wide uninterrupted sensitization bands of such uniform intensity as can be attained only in very imperfect fashion, or not at all, by using sensitizer blends.

In silver bromide-iodide emulsions, on the other hand, these novel sensitizers, unlike dyes known in the art, give an extraordinarily intense sensitization maximum at the short-wave end of the sensitization band which they produce. Because of the high sensitization intensity thus attained in the orthochromatic range of sensitization, as well as their additional sensitivity to red, the sensitizers provided by this invention are better adapted than are those hitherto known in the art for producing a panchromatic sensitization extending all the way through into the long-wave red spectral band, in blends with sensitizers for red, especially those having a gap in the green.

For example, if a dye as provided in accordance with this invention is used in admixture with a red sensitizer having the general formula:

(II)
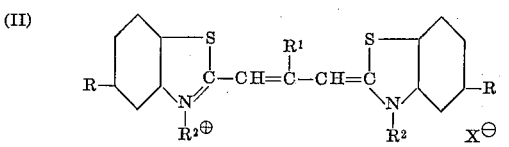

where R is methyl, halogen, e.g., Cl and Vr; $R^1$ is alkyl, e.g., methyl, ethyl and propyl; $R^2$ is alkyl, carboxyalkyl and sulfoalkyl of 1–4 carbons, and X is an anion or negative radical of an acid, e.g., Br, I, ethyl sulfate, p-toluene sulfonate, etc.; then there is obtained in a gelatino-silver bromide-iodide emulsion a panchromatic sensitization which extends from 520 m$\mu$ to 650 m$\mu$ at approximately uniform intensity.

Occurrence of the intense sensitization maximum situated at the short-wave end of the sensitization range is surprising and not predictable, since it is located at shorter wave lengths than the absorption maximum of the dye in alcoholic solution. This runs counter to the familiar rule that the sensitization maximum of a sensitizer is always shifted toward longer wavelength as compared with the absorption maximum in alcoholic solution. This intense short-wave sensitization band is not limited in occurrence to high sensitizer concentrations but appears even when only small amounts of dye are employed.

Emulsions treated with the dyes here disclosed show a substantial increase in overall sensitivity, which is fully retained even when the dye is used at very high concentrations.

The dyes provided in accordance with this invention are further distinguished by the fact that no shift of the sensitization maximum occurs with changes in concentration.

Moreover, in contrast with most of the sensitizers known in the art, these dyes have excellent tolerance to other sensitizers and retain their full sensitizing capacity even in blends.

It is also significant that the sensitizers provided by this invention, as compared with other dyes having similar structure and similar action, leave only exceptionally slight residual color, or none at all, in developed and fixed photographic materials.

The dyes provided by this invention are made, by the methods which are customary in cyanine dye chemistry, from intermediates having the general formula:

(III)

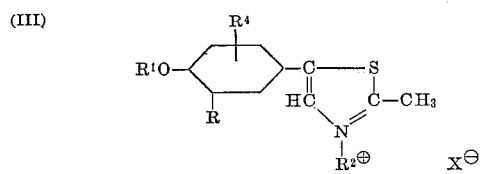

where R is alkyl, e.g., methyl, ethyl and propyl; alkoxy, e.g., methoxy and ethoxy; aryl, e.g., phenyl and naphthyl; $R^1$ is alkyl, e.g., methyl, ethyl and propyl; $R^2$ is alkyl, e.g., methyl, ethyl and propyl; $R^4$ is H, or alkyl, e.g., methyl, ethyl and propyl; and X is anion or a negative radical of an acid, e.g., Br, I, ethyl sulfate or p-toluene sulfonate. Not least, the dyes provided by this invention have the substantial advantage that the intermediates required for the preparation can be obtained in good yields by simple and inexpensive methods.

The sensitizer intermediate of type (III) may suitably be prepared by reacting phenols or phenol ethers (a) with alpha-aminoacetonitrile hydrochloride in nitrobenzene, aided by aluminum chloride. (Cf. in this connection Asscher, Moed et al., Rec. Trav. Chim. 71, 933,944 (1952), and Asscher, ibid. 68, 960 (1947).) The resulting p-substituted omega-aminoacetophenone hydrochlorides (b) are converted to their N-acetyl compounds (c) with acetic anhydride and sodium acetate; on subsequent treatment with di(phosphorus pentasulfide) these derivatives are converted to 5-arylated 2-methylthiazoles (d). Quaternizing of these heterocyclic bases to the reactive quaternary salts of type (II) and condensation to the cyanine dye are effected by the methods which are known and customary in cyanine chemistry:

TABLE I

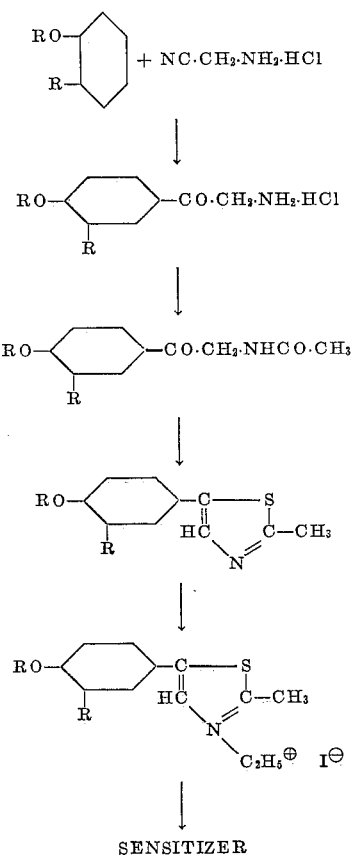

Thus, for example, the 5-arylated-2-methylthiazoles shown in Table II were prepared by this method and were used as intermediates in preparing the sensitizers according to this invention.

TABLE II

| Initial Phenol Ether | Heterocyclic base (d) | Boiling point |
|---|---|---|
| $C_2H_5O-\langle\rangle-$, $O-C_2H_5$ | $C_2H_5O-\langle\rangle-C(=CH)-S-C(CH_3)=N$, $O-C_2H_5$ | At 1.5 mm.: 199–200° C. |
| $H_3CO-\langle\rangle-$, $CH_3$ | $H_3CO-\langle\rangle-C(=CH)-S-C(CH_3)=N$, $CH_3$ | At 1 mm.: 167–172° C. |
| $H_3CO-\langle\rangle-$, $OCH_3$ | $H_3CO-\langle\rangle-C(=CH)-S-C(CH_3)=N$, $OCH_3$ | At 0.8 mm.: 173–175° C. |
| $H_3CO-\langle\rangle-$, $C_6H_5$ | $H_3CO-\langle\rangle-C(=CH)-S-C(CH_3)=N$, $C_6H_5$ | At 1.5 mm.: 233–238° C. |
| $H_3CO-\langle\rangle-$, $CH_3$, $CH_3$ | $H_3CO-\langle\rangle-C(=CH)-S-C(CH_3)=N$, $CH_3$, $CH_3$ | At 2 mm.: 174–179° C. |

TABLE II—Continued

| Initial Phenol Ether | Heterocyclic base (d) | Boiling point |
|---|---|---|
| (phenol ether with CH₃, OCH₃, CH₃) | (corresponding thiazole with CH₃) | At 4 mm.: 171–173° C. |
| (phenol ether with CH₃ CH₃, OCH₃) | (corresponding thiazole with CH₃ CH₃) | At 1 mm.: 176–178° C. |
| (benzofuran) | (benzofuran-thiazole with CH₃) | At 3 mm.: 256–262° C. |

Figure 2:
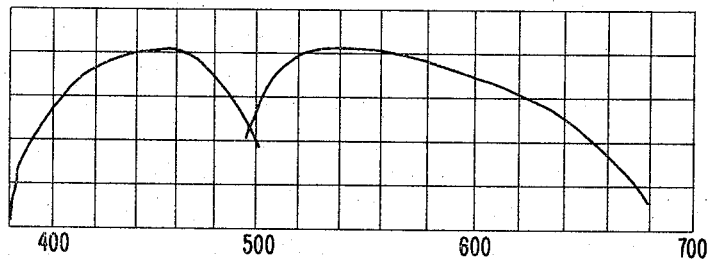
Figure 3:
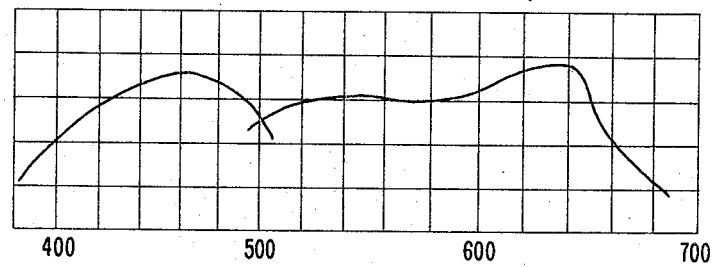
Figure 4:
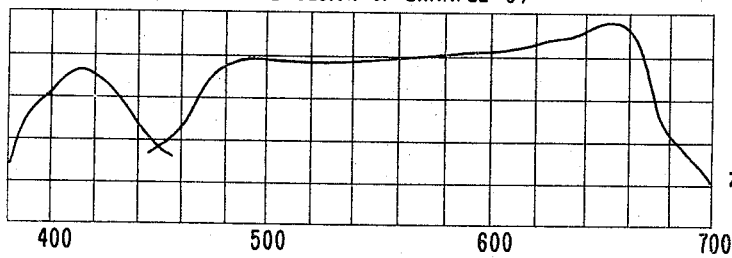

The examples cited below are given in order to clarify more exactly the concept of the invention, without limiting it to the examples. Spectrograms of dye-sensitized gelatino-silver halide emulsions of Examples 1, 2, 3 and 5 are shown in respective FIGS. 1, 2, 3 and 4 of the attached drawings that constitute part of this application.

Example 1

A sensitizer having Formula 1:

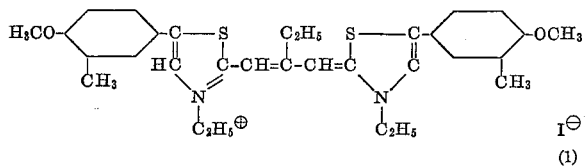

(1)

is added to a photographic silver chloride emulsion in the amount of 60 mg./kg. Sensitization is obtained which extends from the normal sensitivity of the emulsion up to 680 mμ, the uniform intensity. The developed and fixed material is practically free from residual coloration.

The intermediate

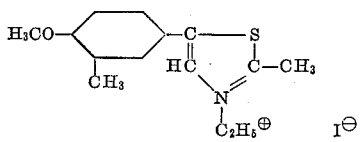

required for making the sensitizer is prepared in the following manner:

*Omega-amino-3-methyl-4-methoxyacetophenone hydrochloride (step b).*—Powdered anhydrous aluminum chloride (416 g.) is dissolved, while stirring, in 960 ml. distilled nitrobenzene. Then 160 g. alpha-aminoacetonitrile hydrochloride is added in portions, while stirring. The reaction vessel is placed in a waterbath to carry away the heat of reaction and the mixture contained therein is treated with 212 g. o-cresol methyl ether. A current of dry HCl gas is next passed through the dark reaction mixture for 6 to 8 hours and the batch is then allowed to stand overnight at room temperature. To process it, the reaction mixture is introduced, with vigorous stirring, into 1.8 liter of water in such a way that a temperature of 70° C. is established. Stirring is then continued until room temperature is reached and the aminoketone hydrochloride is filtered off with suction. After washing with acetone and ether, it can be used without any additional purification. Yield: 325 g., i.e. 86% of theory.

*ω-Acetylamino-3-methyl-4-methoxyacetophenone (step c).*—Omega-amino-3-methyl-4-methoxyacetophenone (105 g.) (step b) is thoroughly mixed with 41 g. anhydrous sodium acetate, then treated with 50 ml. acetic anhydride and 100 ml. glacial acetic acid. The mixture is heated to 80° C. for 2 hrs. on an oil bath. The crystal sludge, obtained after cooling and pouring the mixture into water, is filtered off under strong suction, washed with water and then taken up in chloroform. The chloroform solution is washed first with dilute HCl, then with water. After drying and concentrating the solution by evaporation, the product is a white crystalline mass with melting point 142–144° C. Yield: 78% of theory.

*2-methyl-5-(3-methyl-4-methoxyphenyl)thiazole (step d).*—Omega-acetylamino-3-methyl-4-methoxyphenylacetophenone (step c) is mixed with 22 g. di(phosphorus pentasulfide) and heated to 160° C. for 2 hours while stirring. The thiazole base thus formed is then distilled off in vacuum. Yield: 59% of theory. B.P. at 1 mm.: 167–172° C.

*2-methyl-3-ethyl-5-(3-methyl-4-methoxyphenyl) thiazolium iodide (step e).*—2-methyl-5-(3-methyl-4-methoxyphenyl)thiazole (step d) (55 g.) is heated with 39 g. ethyl iodide at 110° C. for 8 hours in an autoclave. The resulting crystalline mass is triturated with acetone, filtered off with suction and washed dry with ether. Yield: 81% of theory. Decomposition point: 198–202° C.

Condensation of the quaternary salt to the sensitizer dye of Formula 1 may suitably be effected by the methods which are customary and familiar in cyanine chemistry, e.g., by reacting the quaternary salt with the ethyl ortho ester of propionic acid and a strongly basic condensation agent, e.g., triethylamine, in a suitable solvent. The resulting sensitization dye of Formula 1 gives in alcoholic solution an absorption maximum at 583 mμ.

Example 2

To a photographic silver bromide-iodide emulsion there is added a sensitizing dye of the Formula 2:

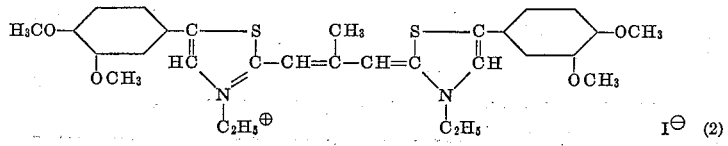

(2)

in the amount of 60 mg./kg. of emulsion. Sensitization is obtained which extends to 680 mμ and shows an intensity maximum at 550 mμ. The increase in overall sensitivity thus attainable amounts to 3 DIN. The developed and fixed photographic material is practically free from residual coloration.

The intermediate required for making the sensitizer:

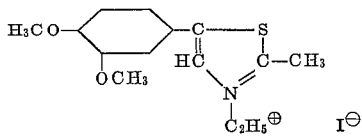

is prepared in the following manner:

*Omega-amino - 3,4 - dimethoxyacetophenone hydrochloride (step b)* is prepared from veratrol and aminoacetonitrile hydrochloride in analogy with Example 1, or according to the statements of Asscher and Moed (Asscher, Moed et al., Rec. Trav. Chim., 71, 933–944 (1952)).

*Omega - acetylamino - 3,4 - dimethoxyacetophenone (step c).*—3,4-dimethoxy - ω - aminoacetophenone hydrochloride (225 g.) is thoroughly mixed with 82 g. anhydrous sodium acetate by trituration. This mixture is then treated with a mixture of 100 ml. acetic anhydride and 200 ml. glacial acetic acid in a round-bottom flask. It is heated to 80° C. for 2 hrs. under a reflux condenser, allowed to cool and poured into water. The separated crystal sludge is filtered off with suction, taken up in chloroform, and the chloroform solution is washed first with dilute hydrochloric acid, then with water. The acetyl derivative crystallizes when the solution is dried and concentrated by evaporation; it can be put to further use without any additional purification. Yield: 89% of theory. M.P. 141–144° C.

*2-methyl - 5 - (3,4 - dimethoxyphenyl) thiazole (step d).*—Omega-acetylamino - 5 - (3,4 - dimethoxyphenyl) acetophenone (step c) (118 g.) is intimately blended with 27 g. di(phosphorus pentasulfide) and heated to 160° C. for 2 hrs. while stirring. Then the base is distilled off in vacuum. Yield: 70% of theory. B.P. at 0.8 mm. 173–175° C.

*2-methyl - 3 - ethyl-5-(3,4-dimethoxyphenyl) thiazolium iodide (step e).*—2-methyl - 5 - (3,4-dimethoxyphenyl) thiazole (step d) (84 g.) is heated with 55 g. ethyl iodide at 110° C. for 8 hrs. in an autoclave. The crystalline mass is triturated with acetone and filtered off with suction. Yield 88% of theory. Decomposition point: 193–197° C.

The condensation of this quaternary salt to a sensitization dye of Formula 2 can be effected by the customary and generally known methods in cyanine chemistry, e.g., by reacting the quaternary salt with the ethyl ortho ester of acetic acid aided by a strongly basic condensation agent such as triethylamine. The resulting pure sensitizer dye has an absorption maximum at 578 mμ.

*Example 3*

Sensitization of a photographic silver bromide-iodide emulsion employs a mixture consisting of the sensitizer of Formula 2 as provided by this invention and the red sensitizer, known in the art, having the formula:

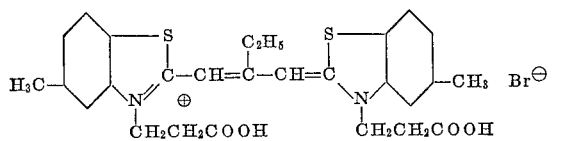

A closed sensitization band is obtained from the self-sensitivity of the emulsion to 670 mμ. The increase in overall sensitivity attainable by the sensitization amounts to 3 DIN. Pohotgraphic material thus sensitized, and developed and fixed according to use, is practicaly free from residual coloration.

*Example 4*

A sensitizer having the formula 3:

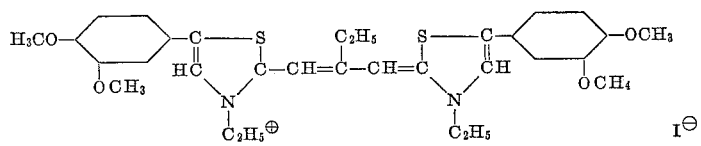

obtained from the substituted 2-methylthiazole of Example 2, sensitizes a silver bromide-iodide emulsion from 500 to 640 mμ with a maximum at 550 mμ. A sensitivity rise of 2 DIN is obtained, and photographic material which is practically free from residual coloration.

*Example 5*

To sensitize a photographic silver chloride emulsion a mixture is employed which contains the sensitizer of Formula 1:

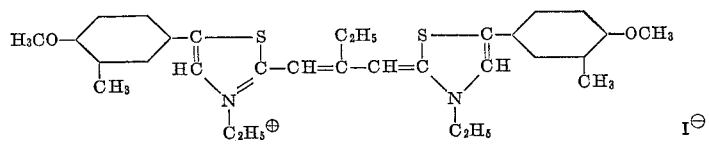

and the familiar red sensitizer having the formula:

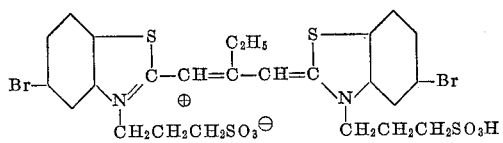

A closed sensitization band from 490–665 mμ, showing an intensity which remains uniform over the entire sensitization range up to the somewhat more intensively sensitized long-wave end. The material is practically free from residual coloration.

The invention is not limited to the sensitization of the specific gelatino-silver halide emulsions of the type given in teh above examples. It may be applied to other simple and mixed silver halide emulsions. The emulsions can contain binding agents other than gelatin or mixtures of gelatin and such binding agents. Suitable binding agents include polyvinyl alcohol and acetals thereof, polyvinyl pyrrolidone, polyvinyl lactams, cellulose esters, dextrin and dextran, the latter two being mixed with gelatin.

The emulsions can contain color formers and other emulsion adjuvants including non-optical sensitizers such as sulfur sensitizers containing labile sulfur, e.g., allyl isothiocyanate, allyl diethyl thiourea, phenyl isothiocyanate and sodium thiosulfate, the polyoxyalkylene ethers in Blake et al., U.S. 2,400,532 and the polyglycols disclosed in Blake et al., U.S. 2,432,549. Other non-optical sensitizers such as amines as taught by Staud et al., U.S. 1,925,508 and metal salts as taught by Baldsiefen et al., U.S. 2,540,086 may also be used. Antifoggants, e.g.

benzotriazole and triazaindenes, can be used as well as the usual hardeners, i.e., chrome alum, formaldehyde, etc.

The emulsion may be coated on any suitable support such as paper or films composed of cellulose esters, e.g., cellulose triacetate, cellulose acetate/butyrate; superpolymers, e.g., polyvinyl chloride (co) vinyl acetate; polyvinyl acetals, e.g., formals, acetals; polystyrene; polyamides, e.g., polyhexamethylene adipamide, and polyesters, e.g., polyethlene, terephthalate, polyethylene terephthalate/isophthalate; esters formed by condensing terephthalic acid and dimethyl terephthalate with propylene glycol, diethylene glycol, tetramethylene glycol or cyclohexane-1,4-dimethanol (hexahydro-p-xylene alcohol). The vinylidene chloride copolymer-coated oriented polyester films of Alles U.S. 2,779,684 are especially suitable.

We claim:
1. A photographic silver halide emulsion characterized in that it contains a 5-substituted thiazolecarbocyanine dye represented by the formula

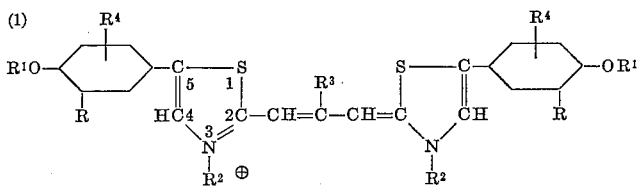

wherein R is a member selected from the group consisting of alkyl, alkoxy and aryl; $R^1$, $R^2$ and $R^3$ are alkyl; $R^4$ is a member selected from the group consisting of hydrogen and alkyl and X is the negative radical of an acid.

2. An emulsion according to claim 1 having gelatin as the binding agent for the silver halide grains.

3. A photographic silver halide emulsion according to claim 2 characterized in that it contains
    (a) a 5-substituted thiazolecarbocyanine dye represented by the formula

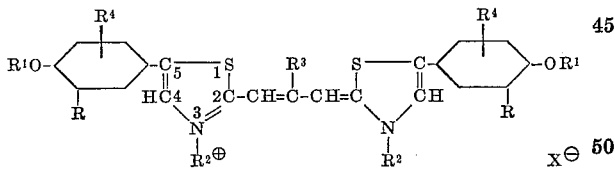

wherein R is a member selected from the group consisting of alkyl, alkoxy and aryl; $R^1$, $R^2$ and $R^3$ are alkyl; $R^4$ is a member selected from the group consisting of hydrogen and alkyl and X is the negative radical of an acid, and (b) a sensitizing dye that confers an extra range of sensitivity in the red region of the visible spectrum, said dye having the general formula

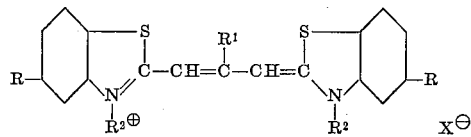

wherein R is a member selected from the group consisting of methyl and halogen; $R^1$ is alkyl; $R^2$ is a member selected from the group consisting of alkyl, carboxylalkyl and sulfoalkyl, and X is the negative radical of an acid.

4. An emulsion according to claim 3 wherein the second dye confers no sensitivity in the green region of the spectrum.

5. An emulsion acording to claim 3 having gelatin as the binding agent for the silver halide grains.

References Cited
UNITED STATES PATENTS

| | | | |
|---|---|---|---|
| 2,304,981 | 12/1942 | Wilmanns | 96—106 |
| 2,870,014 | 1/1959 | Brooker et al. | 96—106 |
| 2,895,955 | 7/1959 | Haseltine et al. | 260—240.5 |
| 2,984,664 | 5/1961 | Fry et al. | 260—240.5 |

NORMAN G. TORCHIN, *Primary Examiner.*

J. TRAVIS BROWN, *Examiner.*